United States Patent [19]

Ziegler

[11] 4,139,285
[45] Feb. 13, 1979

[54] REVERSIBLE INTERMITTENT FILM DRIVE FOR MOTION-PICTURE PROJECTOR

[75] Inventor: Karl Ziegler, Nellingen, Fed. Rep. of Germany

[73] Assignee: Robert Bosch GmbH, Stuttgart, Fed. Rep. of Germany

[21] Appl. No.: 775,361

[22] Filed: Mar. 4, 1977

[30] Foreign Application Priority Data

Mar. 6, 1976 [DE] Fed. Rep. of Germany ....... 2609378

[51] Int. Cl.² .............................................. G03B 1/22
[52] U.S. Cl. .................................................. 352/194
[58] Field of Search ........................ 352/194, 195, 196

[56] References Cited

U.S. PATENT DOCUMENTS

| 3,504,571 | 4/1970 | Kim ..................................... 352/194 |
| 3,640,441 | 2/1972 | Keznickl ............................. 352/195 |
| 3,675,996 | 7/1972 | Wilsch ................................. 352/194 |
| 3,694,065 | 9/1972 | Roth .................................... 352/194 |

Primary Examiner—Monroe H. Hayes
Attorney, Agent, or Firm—Michael J. Striker

[57] ABSTRACT

A film-transport mechanism for perforated strip film in a motion-picture projector comprises a film-transport element having at one end a clause engageable in a perforation of the film and displaceable in a transport direction of the film, and having a cam follower. A cam is rotatable on the projector housing and has a groove whose base surface serves to move the class perpendicular to the film-transport direction into and out of the perforations of this film and whose radially spaced side surfaces constitute respective cam surfaces, one for forward operation of the projector and one for reverse operation. Each of these surfaces has a respective claw-engagement-section, film-transport-section, claw-disengagement-section and claw-return-section in a respective rotational sense of the cam. The film-transport element is biased into engagement with one of the cam surfaces the cam is rotated in one direction and when biased into engagement with the other cam surface it is rotated in the opposite direction. Each of these cam surfaces is so constructed as to advance the film in a most gentle manner in order to minimize film wear whether the film is being driven in the forward or reverse direction.

10 Claims, 2 Drawing Figures

REVERSIBLE INTERMITTENT FILM DRIVE FOR MOTION-PICTURE PROJECTOR

BACKGROUND OF THE INVENTION

This invention relates to a film-transport mechanism. More particularly this invention concerns such a mechanism which drives a perforated strip film, such as a motion-picture film, in either a reverse or forward direction in a projector.

An intermittent film advance mechanism is known such as described in my earlier commonly assigned U.S. Pat. No. 3,860,332, the entire disclosure of which is herewith incorporated by reference. In this arrangement a claw carried on a film-transport element pivoted on the projector housing is moved by means of a cam so that the claw is first inserted into a perforation in the film, then pushes the film longitudinally through an increment, then withdraws from this perforation, and finally returns to its original position so as to be aligned with the immediately trailing perforation of the film so that it can again engage therein and advance the film another step or increment. During the actual displacement of the film, which is as mentioned above intermittent, a rotary disk shutter temporarily prevents light from the lamp and condenser of the projector from shining through the film onto the screen.

The cam that operates the film-transport element is typically of the rotary type having an annular cam surface surrounding the rotation axis of the cam. The radially inner or outer surface of this cam, depending on its type, is contoured for a gentle acceleration of the film so that this film is brought up to transport speed gently. In addition an axial face of this cam is contoured in order to raise and lower the claw from the film, thereby withdrawing and inserting it in the perforation thereof.

Such an arrangement has proven itself highly efficient in the forward advance of a film. The particularly gentle action of the feed claw prevents damage to the film and insures that each frame of the film is exactly aligned with the lens and disk shutter for best projection results. Nonetheless this system has the disadvantage that it cannot be readily reverse-driven during projection of the film so as to allow the film to be projected while being reverse-driven.

The main problem during such reverse operation is that the section of the cam responsible for the film transport itself is so shaped as to bring the claw gently into contact with the leading edge of the perforation in the film, and thereafter to move the claw with ever increasing speed to displace the film smoothly from a complete stop. Once the film has been advanced into the desired position it can be stopped relatively abruptly due to its small mass so that the claw need merely be pulled out of the perforation. When operated in reverse this means that the claw will be brought rather sharply into contact with the edge of the perforation, thereby generating considerable noise and simultaneously damaging the film or at least causing it to wear at a much greater rate.

Another disadvantage of this arrangement is that the claw is somewhat smaller than the perforation, so that when reverse-driven the frames of the film will not be exactly aligned with the projector lens. Thus readjustment of the projector is necessary for such reverse-driving.

Another disadvantage of these systems is that when driven in reverse the frames of the film are stationary during a different time related to the shutter plate than when driven forward. Thus it is necessary to modify the disc shutter so that it blocks out the film for a longer period of time. This decreases overall image brightness and requires yet another modification of the projector.

SUMMARY OF THE INVENTION

It is therefore an object of the present invention to provide an improved film-transport system for use in a projector, camera, or the like.

Another object is to provide such a system which displaces the film step-by-step intermittently in an optimally efficient manner in both the forward and reverse directions.

Yet another object is to provide such a system which eliminates the necessity for special shutters and other complicated mechanism on the projector.

These objects are attained according to the present invention in a film-transport system wherein the cam is formed with two adjacent surfaces. One of these surfaces is formed so that, when the cam is rotated in a forward rotational sense, the film is transported in steps in an optimal manner, that is with slow starting speed and gentle handling. Another cam surface on this same cam is shaped so that when the cam is operated in a reverse rotational sense the film is displaced in the reverse direction again in an optimal manner. Means is provided for biasing the cam follower of the transport element into engagement in a forward-drive position with the forward-drive cam surface and in a reverse-drive position with the reverse-drive cam surface. The drive motor for this cam is reversable and it is also connected to the switching means so that the cam is automatically reverse-rotated in the reverse position and forward-rotated in the forward position.

In accordance with further features of this invention the cam is formed with an endless annular groove circling the rotation axis of the cam and having a base and a pair of radially spaced side faces. The contouring of the base surface of the cam serves for raising and lowering the claw, that is for inserting it into and withdrawing it from the perforations in the film. One of the side surfaces of the cam acts as the forward-drive cam surface and the other side surface is the reverse-drive cam surface. Each of these cam surfaces is subdivided as described above into a film-transport-section, a claw-disengagement-section, a claw-return-section and a claw-engagement-section. In accordance with this invention the film-transport-sections of the two cams are radially aligned, that is they occupy the same angular sector of the cam. In the claw-engagement-section, the film-transport-section and the claw-disengagement-section, the cam groove is somewhat deeper than over the rest of the cam groove, so that only during these sections can the claw drop down into a perforation of the film. Thus the groove portion corresponding to these sections is deeper than the rest of the groove, and is connected to the rest of the groove via inclined portions one of which is beside to the claw-engagement-section of the forward cam surface and the claw-disengagement section of the reverse cam surface and the other of which is beside to the claw-engagement-section of the reverse surface and the claw-disengagement-section of the forward surface. According to this invention the engagement section of each cam is substantially longer than the disengagement section of the same cam. In fact the engagement sections of the two cams are of the same angular width, although two opposite angular sides of the respective film-displacement sections. Similarly the claw-disengagement sections, which are relatively short are also of the same angular width.

According to further features of this invention the element is an arm pivoted at one end on the camera or projector housing and carrying at its opposite end the above-mentioned claw. Intermediate these ends is a laterally projecting pin which fits into the groove of the cam. A displaceable guide is connected to this element via a pair of springs and is displaceable between a forward position urging the cam follower via the forward spring against the forward cam surface and a reverse position urging the cam follower via the reverse spring against the reverse cam surface. Switch means coacting with a slider is connected to the motor for the apparatus for automatically reversing its rotational direction.

According to yet another feature of this invention the cam groove described above is substantially radially wider at the angular ends of the portion corresponding to the film displacement sections of the cam surfaces. This width is sufficient to insure that a frame of the film, whether being moved forwardly or in reverse, is always properly aligned with the lens of the projector or camera. The angular distance between the forward and reverse cam surfaces at the angular ends of the film-displacement sections is sufficient that if the cam follower is moved from one surface to the other the claw is moved through a distance equal to the length of the perforation in the direction of transport of the film minus the length of the claw in the same direction.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

DESCRIPTION OF A PREFERRED EMBODIMENT

Figure 1:
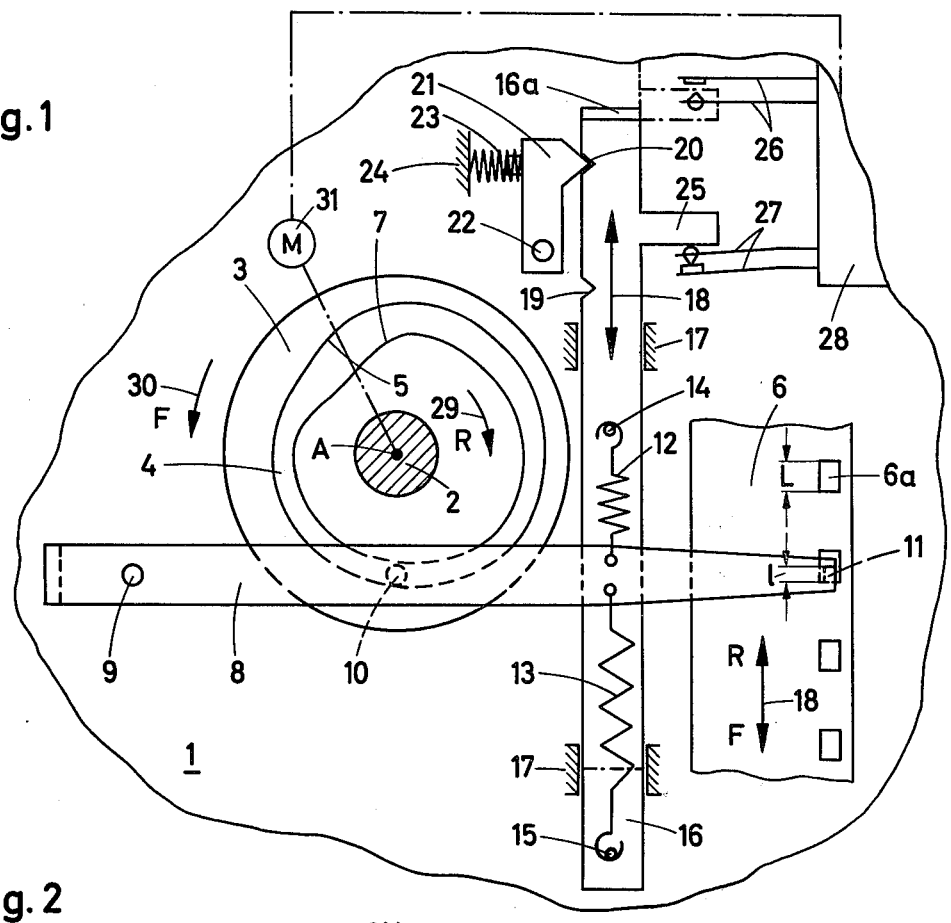
FIG. 1 is a partly schematic end view of the mechanism according to this invention.

As shown in FIG. 1 a projector according to the present invention has a housing 1 in which a drive shaft 2 is rotatable about a fixed axis A. This shaft 2 carries a cam 3 having a groove 4 surrounding the axis A and itself having a radially outer side surface 5 and a radially inner side surface 7.

A film-transport lever 8 is pivoted at its one end at 9 on the housing 1 and has at its other end a claw 11 engageable in a perforation 6a of a piece of strip film 6. Between its claw 11 at one end and pivot 9 at its other end the element 8 is provided with a pin 10 projecting parallel to the axis A and extending into the groove 4.

A control member or slider 16 is displaceable in a direction 18 on the housing 16 in a guide 17 so as to be displaceable parallel to the film 6. This slider 16 extends underneath and across the lever 8 between its cam follower 10 and its claw 11. The slider 16 has pins 14 and 15 flanking the element 8 and connected to it by respective reverse and forward tension springs 12 and 13. A pair of stable rest positions are defined for the slider 16 by a pair of notches 19 and 20 offset in the direction 18 and engageable by a point of a pawl 21 pivoted on the housing 1 at 22 and biased by a spring 23 braced against a housing abutment 24 into these notches 19 and 20. In addition the slider 16 has a handle 16a projecting outside the projector housing and is provided with a laterally extending arm 25.

A switch 28 on the camera housing 1 is connected to a drive motor 31 which can drive the cam 3 in a forward direction indicated by arrow 30 or a reverse direction indicated by arrow 29. This switch 28 also has contacts 26 and 27 engageable with the arm 25 in the reverse and forward positions thereof, respectively. The forward position is shown in solid lines in FIG. 1 and the reverse position in dot-dash lines.

The outer or forward cam surface 5 is subdivided in the forward rotational sense indicated by arrow 30 into a film-transport-section $\alpha_1$, a claw-engagement-section $\beta_1$, a return section $\delta_1$, and a claw-disengagement section $\gamma_1$. To each side of the claw-disengagement-section $\delta_1$, there is a section z of constant radius relative to the axis A in which the claw 11 is not displaced along the film 8. Similarly the inner or reverse-drive cam surface 7 is subdivided angularly in the directin 29 into a film-transport-section $\alpha_2$, a claw-engagement-section $\beta_2$, a claw-return-section $\delta_2$, and a claw-disengagement section $\gamma_2$.

Figure 2:
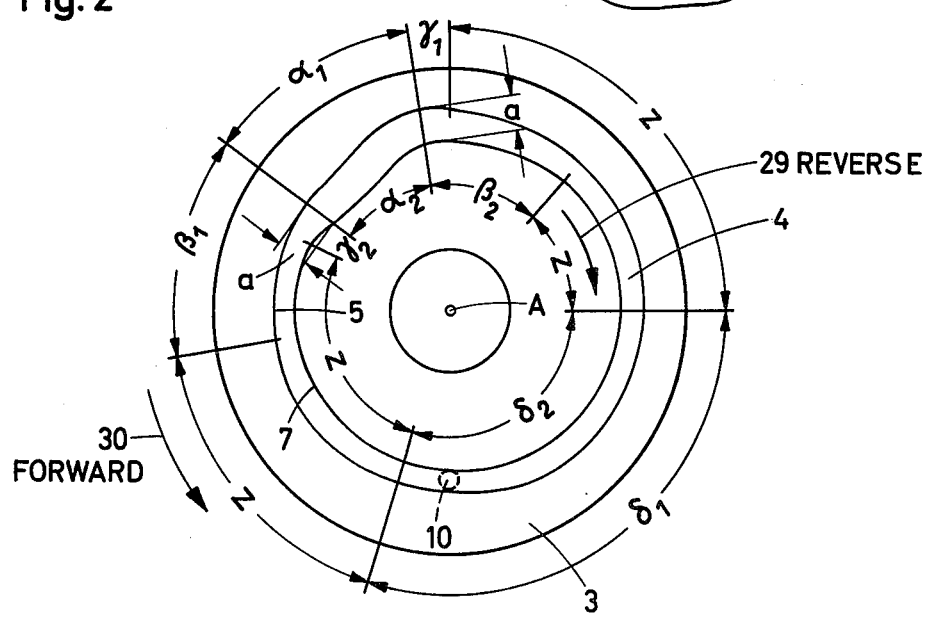
FIG. 2 is a large-scale diagrammatic view illustrating the cam according to the present invention.

FIG. 2 shows how the two film-transport sectins $\alpha_1$ and $\alpha_2$ confront one another and are radially aligned, occupying the same segment relative to the axis A. Furthermore each of these sections $\alpha_1$ and $\alpha_2$ is of increasing steepness in the respective rotational direction 30 and 29 so that if the cam followers engage with either of these it will be moved in the direction 18 with increasing speed. The disengagement sections $\gamma_1$ and $\gamma_2$ are of like angular width and are equal to approximately one-third of the angular width of the respective sections $\alpha_1$ and $\alpha_2$. Furthermore the sections $\delta_1$ and $\delta_2$ are of substantially the same angular length and are equal substantially to the sections $\alpha_1$ and $\alpha_2$.

The claw 11 has a length l in the direction 18 which is much smaller than the length L in the same direction of the perforation 6a. In addition the groove 4 has an angular width a at the start and end of the sections $\alpha_1$ and $\alpha_2$ which is so dimensioned that if the follower 10 is displaced at the ends of the regions $\alpha_1$ and $\alpha_2$ from the one cam 5 to the other cam 7 or vice versa the claw 11 will be moved exactly in the direction 18 through a distance equal to L-l. This dimensioning insures that in both reverse and forward driving of the film the frame of the film will be positioned exactly behind the projector lens.

With the system according to the present invention it is therefore a very simple matter to reverse-crank the projector. This allows a scene to be played back in reverse under full projection, driving the film in the same relatively gentle manner that is employed during forward cranking of the projector. This is mainly embodied in the fact that after the claw 11 has been inserted parallel to the axis A in one of the perforations 6a it is brought gently and slowly into contact with the leading edge of the perforation 6a and is thereafter uniformly accelerated so as to displace the film 6 with minimum damage thereto. At the end of the displacement the claw 11 comes to rest and is moved out of engagement with the film at the leading end of the perforation out of the perforation and back into axial alignment with the trailing perforations 6a.

It will be understood that each of the elements described above, or two or more together, may also find a useful application in other types of reversible intermittend film drives, differing from the types described above.

While the invention has been illustrated and described as embodied in a motion-picture projector, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A film-transport mechanism for perforated strip film, said mechanism comprising: a film-transport element having a claw engageable in a perforation of the film and displaceable so as to move the latter in either of two mutually opposite transport directions; a cam rotatable in a forward and reverse mutually opposite circumferential directions and formed with a forward cam surface and a reverse cam surface juxtaposed therewith and spaced therefrom, each of said surfaces having a respective film-transport-section, claw-engagement-section and claw-disengagement-section located at opposite sides of said film-transport-section, and claw-return-section; a cam follower connected with said film-transport element having said claw and being displaceable in a forward-drive position into engagement with said forward cam surface and in a reverse-drive position into engagement with said reverse cam surface, said film-transport sections of said surfaces directly confronting each other over the same angular segments of said cam and being spaced apart at their ends so that on displacement of said cam follower at said ends from one of said cam surfaces to the other cam surface said claw moves through a distance substantially equal to L-l, wherein L-is the length of one of said perforations and l-is the length of said claw, said sections of each of said cam surfaces being shaped so that on displacement of said cam follower engaging one of said surfaces of said cam and thereby on displacement of said claw the latter is moved toward engagement with the film at the leading end of the perforation, thereafter displaced to move said film in one of said transport directions, thereafter withdrawn from the leading end of the perforation, and thereafter returned in said direction to a position aligned with a trailing perforation of said film; means for urging said cam follower into engagement with said forward and reverse cam surface and connected with said film-transport element; and reversible drive means operative in two mutually opposite senses and connected to said cam for rotating the latter in said two mutually opposite circumferential directions, whereby by operation of said drive means in one of said senses and by rotation of only one cam in one of said circumferential directions said cam follower is displaced into engagement with one of said surfaces of said cam and moved in engagement with the same so that the film is engaged and transported in one of said transport directions, whereas by subsequent operation of said drive means in the other sense and rotation of the same one cam in the other circumferential direction said cam follower is displaced into engagement with the other surface of said cam and moved in engagement with the same so that the film is engaged and transported in the other transport direction.

2. The mechanism defined in claim 1, wherein each of said claw-engagement-sections is longer than the respective claw-disengagement-section.

3. The mechanism defined in claim 2, wherein said claw-engagement-sections are of like length, said claw-disengagement sections similarly being of like length.

4. The mechanism defined in claim 1, wherein said cam is rotatable about a cam axis and said surfaces are each annular and surround said cam axis.

5. The mechanism defined in claim 4, wherein said cam is formed with an annular endless groove encircling said axis and having a pair of radially spaced sides each constituting a respective one of said cam surfaces.

6. The mechanism defined in claim 5, wherein said groove is formed with a base surface between said sides, said base being contoured and engaged by said follower for displacement of said claw generally parallel to said axis and perpendicular to said direction.

7. The mechanism defined in claim 5; said drive means comprising a reversible drive connected to said cam and a switch for operation of said drive in one sense in said forward-drive position and in the opposite sense said reverse-drive position.

8. The mechanism defined in claim 1, wherein each of said claw-disengagement-sections is at most half as long as the respective claw-engagement section.

9. The mechanism defined in claim 1; further comprising means connected to said means for urging for rotating said cam about an axis in a reverse rotational sense in said reverse-drive position and in a forward rotational sense in said forward-drive position, said surfaces being endless and centered on said axis, each of said film-transport sections being of increasing steepness in the respective rotational sense.

10. The mechanism defined in claim 9, wherein said film-transport sections are complementarily shaped.

* * * * *